(12) United States Patent
Lu et al.

(10) Patent No.: US 8,275,252 B1
(45) Date of Patent: Sep. 25, 2012

(54) CAMERA

(75) Inventors: Chung-Pin Lu, New Taipei (TW); Yi-Yu Chen, Taipei (TW)

(73) Assignee: Altek Corporation, Hsinchu (TW)

( * ) Notice: Subject to any disclaimer, the term of this patent is extended or adjusted under 35 U.S.C. 154(b) by 0 days.

(21) Appl. No.: 13/165,758

(22) Filed: Jun. 21, 2011

(30) Foreign Application Priority Data

Apr. 1, 2011 (TW) .............................. 100111556 A

(51) Int. Cl.
*G03B 15/03* (2006.01)
*H04N 5/222* (2006.01)
(52) U.S. Cl. ........................... 396/157; 362/11; 348/371
(58) Field of Classification Search ................ 396/157, 396/176; 362/3, 5, 8, 16, 11; 348/371
See application file for complete search history.

(56) References Cited

U.S. PATENT DOCUMENTS

2005/0212684 A1* 9/2005 Huang ..................... 340/815.45

* cited by examiner

*Primary Examiner* — Rochelle-Ann J Blackman
(74) *Attorney, Agent, or Firm* — Jianq Chyun IP Office

(57) ABSTRACT

A camera including a main body, a lens and a flashlight module is provided. The main body has an image capturing unit. The lens is disposed on the main body at a position corresponding to the image capturing unit for guiding lights to the image capturing unit. The flashlight module includes a first light source and second light sources. The first light source is disposed on the main body and has a first emitting area. The second light sources are disposed on the main body and surround the first light source. Each second light source has a second emitting area. The second emitting areas surround the first emitting area.

7 Claims, 3 Drawing Sheets

CAMERA

CROSS-REFERENCE TO RELATED APPLICATION

This application claims the priority benefit of Taiwan application serial no. 100111556, filed on Apr. 1, 2011. The entirety of the above-mentioned patent application is hereby incorporated by reference herein and made a part of this specification.

BACKGROUND

1. Field of the Invention

The invention relates to an image capturing device. Particularly, the invention relates to a camera.

2. Description of Related Art

Most of cameras are equipped with flashlights. The flashlight is an artificial light source used for shooting, and when a shutter of a camera is pressed, the flashlight lights a scene within about 1/1000 to 1/200 second to supplement light to a shooting object, so as to increase luminance of the shooting object in case of insufficient natural light conditions.

In detail, after the shutter is pressed, the flashlight performs a pre-flash to estimate a required light intensity. Generally, the light intensity of the flashlight is determined based on a principle that the shooting object is not over exposed, so that the flashlight generally cannot provide sufficient light to surrounding of the shooting object, which lead to a result that secondary shooting objects around the shooting object and the background are excessively dark. However, it is easy to cause over exposure of the shooting object to increase the light intensity of the flashlight to ameliorate the excessive dark phenomenon around the shooting object. Moreover, if a certain distance is maintained between a foreground and the background of the shooting object, shadow is appeared around the shooting object under the function of the flashlight. Therefore, while the flashlight is used to provide suitable light to the shooting object, luminance of the surrounding of the shooting object cannot be simultaneously considered, which may cause a poor quality of the captured image.

SUMMARY OF THE INVENTION

The invention is directed to a camera, in which a flashlight module is capable of providing suitable lights to a shooting object and surrounding of the shooting object.

The invention provides a camera including a main body, a lens and a flashlight module. The main body has an image capturing unit. The lens is disposed on the main body at a position corresponding to the image capturing unit for guiding lights to the image capturing unit. The flashlight module includes a first light source and second light sources. The first light source is disposed on the main body and has a first emitting area. The second light sources are disposed on the main body and surround the first light source. Each second light source has a second emitting area. The second emitting areas surround the first emitting area.

In an embodiment of the invention, the second light sources are light emitting diode (LED) light sources.

In an embodiment of the invention, the main body has a surface, the first light source is located on the surface, and the second light sources are located on the surface and symmetrically surround the first light source.

In an embodiment of the invention, the surface has a rectangular area, the first light source is located in the rectangular area, a number of the second light sources is four, and the second light sources are respectively located at four corners of the rectangular area.

In an embodiment of the invention, the surface has a rectangular area, the first light source is located in the rectangular area, a number of the second light sources is six, and the second light sources are respectively located at four corners and two long sides of the rectangular area or located at the four corners and two short sides of the rectangular area.

In an embodiment of the invention, the camera further includes a controller coupled to the first light source and the second light sources. When the image capturing unit captures an image of a shooting object through the lens, the controller simultaneously triggers the first light source and the second light sources.

In an embodiment of the invention, before the image capturing unit captures the image of the shooting object, the controller triggers the first light source to perform a pre-flash, and determines a light emitting intensity of the first light source and light emitting intensities of the second light sources according to the pre-flash.

According to the above descriptions, the flashlight module of the invention includes the first light source and the second light sources surrounding the first light source. When the first light source flashes the shooting object and the surrounding of the shooting object cannot obtain enough light from the first light source, the second light sources provide light to the surrounding of the shooting object, so that the shooting object and secondary shooting objects around the shooting object and the background may have enough luminance during shooting, so as to avoid generating shadow around the shooting object due to that a certain distance is maintained between a foreground and the background of the shooting object.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
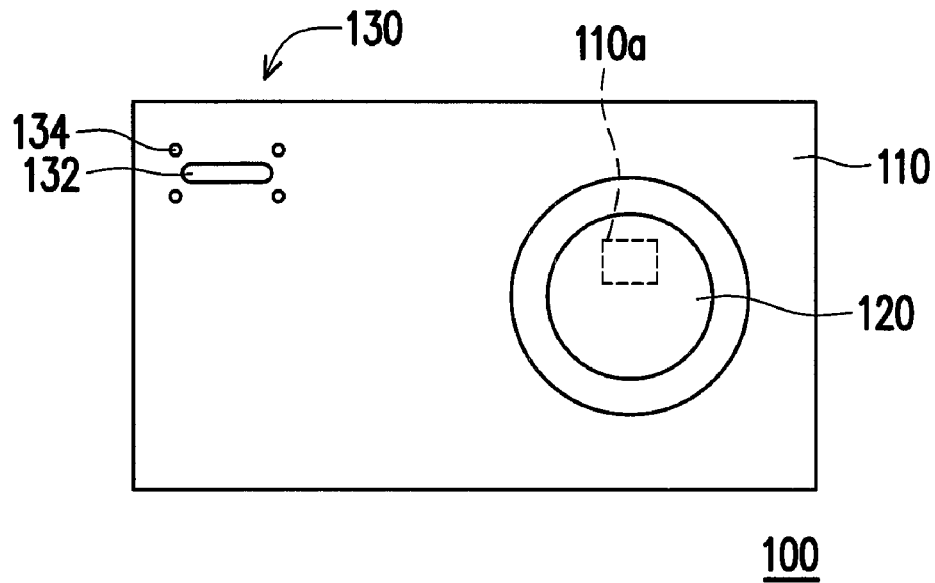
FIG. 1 is a front view of a camera according to an embodiment of the invention.
Figure 2:
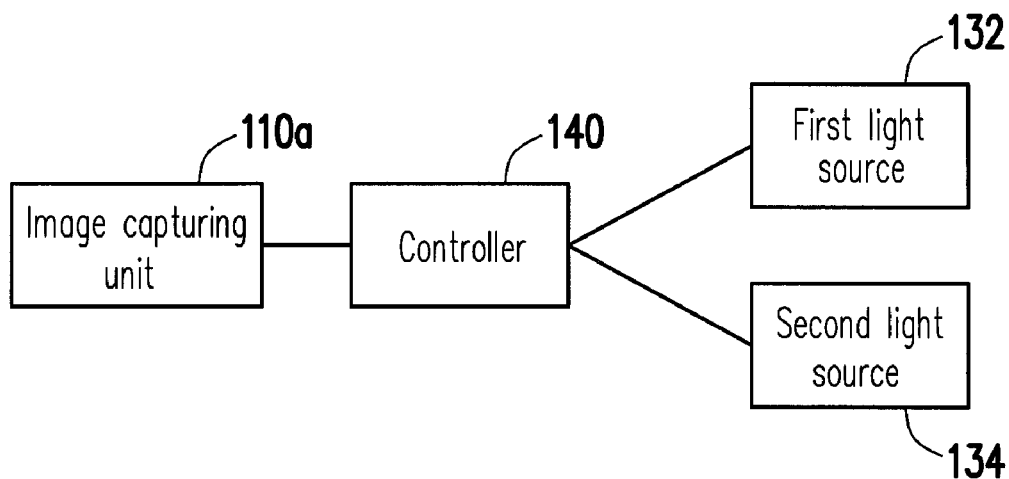
FIG. 2 is a block diagram of the camera of FIG. 1.

FIG. 1 is a front view of a camera according to an embodiment of the invention. FIG. 2 is a block diagram of the camera of FIG. 1. Referring to FIG. 1 and FIG. 2, the camera 100 of the present embodiment includes a main body 110, a lens 120, a flashlight module 130 and a controller 140. The main body 110 has an image capturing unit 110a. The lens 120 is disposed on the main body 110 at a position corresponding to the image capturing unit 110a for guiding lights to the image capturing unit 110a. The flashlight module 130 includes a first light source 132 and second light sources 134. The first light source 132 is disposed on the main body 110, and the second light sources 134 are disposed on the main body 110 and surround the first light source 132. The controller 140 is coupled to the first light source 132 and the second light sources 134. When the image capturing unit 110a captures an image of a shooting object through the lens 120, the controller 140 simultaneously triggers the first light source 132 and the second light sources 134. In the present embodiment, the first light source 132 is, for example, the same to a general flashlight of a conventional camera, and the second light sources 134 are, for example, light emitting diode (LED) light sources.

Figure 3:
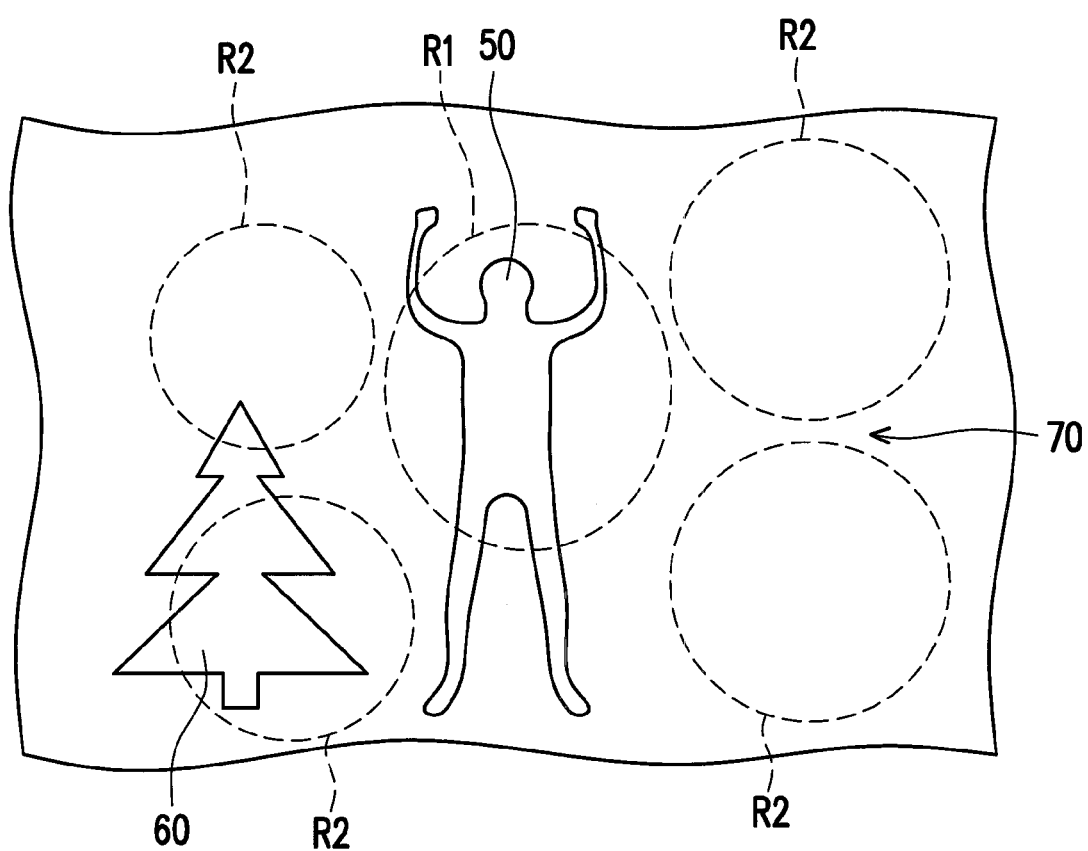
FIG. 3 is a schematic diagram of scene captured by the camera of FIG. 1.

FIG. 3 is a schematic diagram of scene captured by the camera of FIG. 1. A user can use the camera 100 of FIG. 1 to shoot the scene shown in FIG. 3. The first light source 132 has a first emitting area R1, and the second light sources 134 respectively have a second emitting area R2, where the second emitting areas R2 surround the first emitting area R1. During a shooting process, when the image capturing unit 110a captures an image of a shooting object 50 located at the center of FIG. 3 through the lens 120, the first light source 132 flashes the first emitting area R1 to illuminate the shooting object 50, and the second light sources 134 flash the second emitting areas R2 to illuminate the surrounding of the shooting object 50. In this way, when the first light source 132 flashes the shooting object 50 and the surrounding (for example, a secondary shooting object 60 and a background 70) of the shooting object 50 cannot obtain enough light from the first light source 132, the second light sources 134 provide lights to the surrounding of the shooting object 50, so that the shooting object 50 and secondary shooting object 60 around the shooting object 50 and the background 70 may have enough luminance during shooting, so as to avoid excessive dark of the scene outside the shooting object 50.

Further, after the user presses a shutter of the camera 100 and before the image capturing unit 110a captures the image of the shooting object 50, the controller 140 first triggers the first light source 132 to perform a pre-flash to the scene shown in FIG. 3 to determine an intensity of the flash to be sent by the first light source 132, so as to ensure that the shooting object 50 has enough luminance without being over exposed due to the flash of the first light source 132. The pre-flash of the first light source 132 may further determine intensities of the flashes to be sent by the second light sources 134, so that the surrounding objects of the shooting object 50 may obtain suitable light to have enough luminance.

Figure 4:
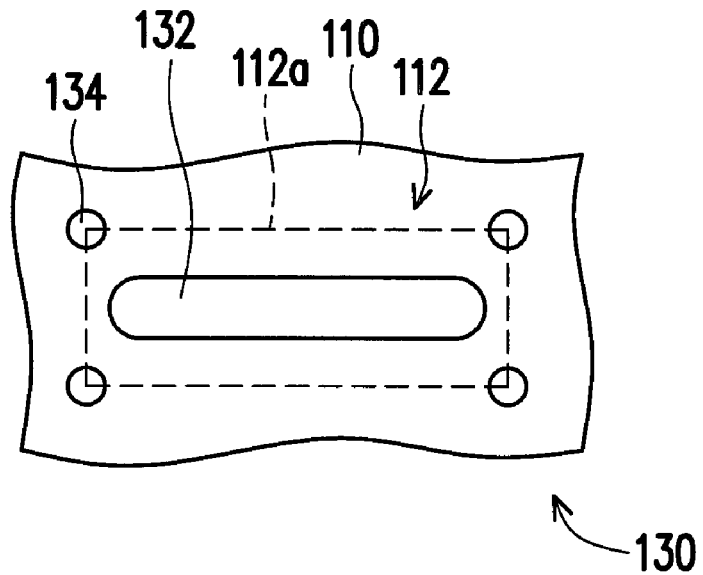
FIG. 4 is a schematic diagram of the flashlight module of FIG. 1.

FIG. 4 is a schematic diagram of the flashlight module of FIG. 1. Referring to FIG. 4, in detail, the main body 110 has a surface 112, and the first light source 132 is located in a rectangular area 112a on the surface 112. A number of the second light sources 134 is four, and the second light sources 134 are respectively located at four corners of the rectangular area 112a and symmetrically surround the first light source 132, so that the lights emitted by the second light sources 134 can symmetrically and evenly irradiate the surrounding of the shooting object 50 of FIG. 3. The number and configuring positions of the second light sources are not limited by the invention, and another embodiment is provided below with reference of a figure for description.

Figure 5:
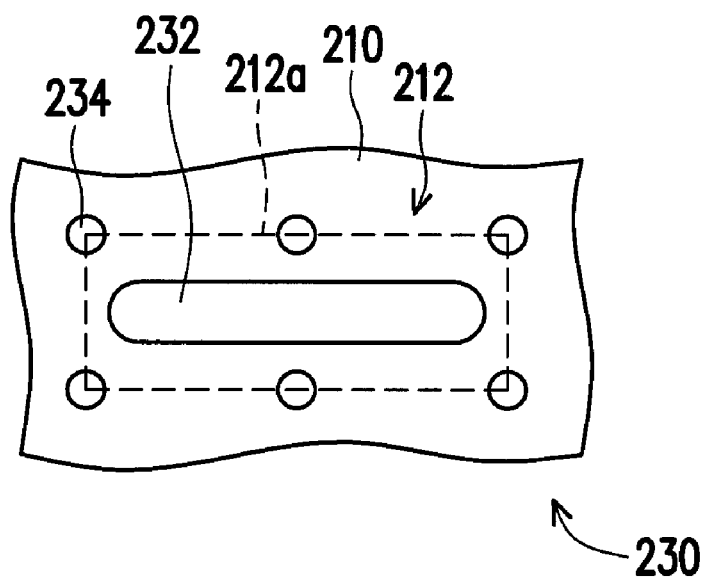
FIG. 5 is a schematic diagram of a flashlight module according to another embodiment of the invention.

FIG. 5 is a schematic diagram of a flashlight module according to another embodiment of the invention. Referring to FIG. 5, in the flashlight module 230 of the present embodiment, a first light source 232 is located in a rectangular area 212a on a surface 212 of a main body 210. A number of second light sources 234 is six, and the second light sources 234 are respectively located at four corners and two long sides of the rectangular area 212a, and symmetrically surround the first light source 232, so that the lights emitted by the second light sources 234 can symmetrically and evenly irradiate the surrounding of the shooting object. In the present embodiment, lengths of the long side and a short side of the rectangular area 212a can be the same or different. In other embodiments, the number of the second light sources 234 can be varied, and the second light sources 234 can be arranged at other potions on the surface 212 in an array. For example, the second light sources located at the two long sides of the rectangular area can be designed to respectively locate at two short sides of the rectangular area, which is not limited by the invention.

In summary, the flashlight module of the invention includes the first light source and the second light sources surrounding the first light source. When the first light source flashes the shooting object and the surrounding of the shooting object cannot obtain enough light from the first light source, the second light sources provide light to the surrounding of the shooting object, so that the shooting object and the secondary shooting objects around the shooting object and the background may have enough luminance during shooting, so as to avoid generating shadow around the shooting object due to that a certain distance is maintained between the foreground and the background of the shooting object. Moreover, the first light source is adapted to perform the pre-flash before the image capturing unit captures the image of the shooting object, so as to determine the intensity of the flash sent by the first light source and ensure that the shooting object has enough luminance without being over exposed due to the flash of the first light source. The pre-flash may further determine intensities of the flashes sent by the second light sources, so that the surrounding objects of the shooting object may obtain suitable light to have enough luminance.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A camera, comprising:
    a main body, having an image capturing unit;
    a lens, disposed on the main body at a position corresponding to the image capturing unit, for guiding lights to the image capturing unit; and
    a flashlight module, comprising:
        a first light source, disposed on the main body, and having a first emitting area; and
        a plurality of second light sources, disposed on the main body and surrounding the first light source, and respectively having a second emitting area, wherein the second emitting areas surround the first emitting area, wherein when the image capturing unit captures an image of a shooting object through the lens, the first light source flashes the first emitting area to illuminate the shooting object, and the second light sources flash the second emitting areas to illuminate the surrounding of the shooting object.

2. The camera as claimed in claim 1, wherein the second light sources are light emitting diode (LED) light sources.

3. The camera as claimed in claim 1, wherein the main body has a surface, the first light source is located on the surface, and the second light sources are located on the surface and symmetrically surround the first light source.

4. The camera as claimed in claim 3, wherein the surface has a rectangular area, the first light source is located in the rectangular area, a number of the second light sources is four, and the second light sources are respectively located at four corners of the rectangular area.

5. The camera as claimed in claim 3, wherein the surface has a rectangular area, the first light source is located in the rectangular area, a number of the second light sources is six, and the second light sources are respectively located at four corners and two long sides of the rectangular area or located at the four corners and two short sides of the rectangular area.

6. The camera as claimed in claim 1, further comprising:
a controller, coupled to the first light source and the second light sources, wherein when the image capturing unit captures an image of a shooting object through the lens, the controller simultaneously triggers the first light source and the second light sources.

7. The camera as claimed in claim 6, wherein before the image capturing unit captures the image of the shooting object, the controller triggers the first light source to perform a pre-flash, and determines a light emitting intensity of the first light source and light emitting intensities of the second light sources according to the pre-flash.

* * * * *